United States Patent
Zong et al.

(10) Patent No.: US 11,747,510 B2
(45) Date of Patent: Sep. 5, 2023

(54) SECURITY INSPECTION DEVICE

(71) Applicants: NUCTECH COMPANY LIMITED, Beijing (CN); TSINGHUA UNIVERSITY, Beijing (CN); NUCTECH (BEIJING) COMPANY LIMITED, Beijing (CN)

(72) Inventors: Chunguang Zong, Beijing (CN); Quanwei Song, Beijing (CN); Kejin Gao, Beijing (CN); Shangmin Sun, Beijing (CN); Junping Shi, Beijing (CN); Yuan He, Beijing (CN); Yu Hu, Beijing (CN); Feng Wang, Beijing (CN); Jinguo Cao, Beijing (CN)

( * ) Notice: Subject to any disclaimer, the term of this patent is extended or adjusted under 35 U.S.C. 154(b) by 136 days.

(21) Appl. No.: 17/420,676

(22) PCT Filed: Jan. 6, 2020

(86) PCT No.: PCT/CN2020/070386
§ 371 (c)(1),
(2) Date: Jul. 4, 2021

(87) PCT Pub. No.: WO2020/140992
PCT Pub. Date: Jul. 9, 2020

(65) Prior Publication Data
US 2022/0099858 A1    Mar. 31, 2022

(30) Foreign Application Priority Data
Jan. 4, 2019   (CN) .......................... 201910009046.2

(51) Int. Cl.
*G01V 5/00* (2006.01)
*G01N 23/10* (2018.01)

(52) U.S. Cl.
CPC ........... *G01V 5/0066* (2013.01); *G01N 23/10* (2013.01)

(58) Field of Classification Search
CPC ...... G01V 5/00; G01V 5/0066; G01V 5/0016; G01N 23/10
See application file for complete search history.

(56) References Cited

U.S. PATENT DOCUMENTS

| | | | |
|---|---|---|---|
| 8,579,506 B2 * | 11/2013 | Morton | G01N 23/04 378/194 |
| 10,082,597 B2 | 9/2018 | Song et al. | |

FOREIGN PATENT DOCUMENTS

| | | |
|---|---|---|
| CN | 104749649 A | 7/2015 |
| CN | 105445288 A | 3/2016 |

(Continued)

OTHER PUBLICATIONS

Search Report of the patent application No. P.438331 issued by the Polish Patent Office, dated Dec. 22, 2021.
(Continued)

*Primary Examiner* — Jurie Yun
(74) *Attorney, Agent, or Firm* — KILPATRICK TOWNSEND & STOCKTON, LLP

(57) ABSTRACT

An inspection device is provided, includes a first vehicle body, a radiation source, arranged in the first vehicle body, a second vehicle body, a protective wall, arranged on the second vehicle body, a boom, and detectors, arranged on the boom, and the boom is rotatably connected to the first vehicle body and the second vehicle body, forms an inspection passage together with the first vehicle body and the second vehicle body. The inspection device can improve the adaptability.

16 Claims, 2 Drawing Sheets

(56) References Cited

FOREIGN PATENT DOCUMENTS

| | | |
|---|---|---|
| CN | 106324693 A | 1/2017 |
| CN | 206339666 U | 7/2017 |
| CN | 107765320 A | 3/2018 |
| CN | 108363111 A | 8/2018 |
| CN | 108732192 A | 11/2018 |
| CN | 109521481 A | 3/2019 |
| CN | 109597138 A | 4/2019 |
| CN | 109932755 A | 6/2019 |
| CN | 209542865 U | 10/2019 |
| CN | 209624791 U | 11/2019 |
| CN | 209765072 U | 12/2019 |
| EP | 3489724 A1 | 5/2019 |
| RO | 131901 A2 | 5/2017 |
| WO | 2018041143 A1 | 3/2018 |

OTHER PUBLICATIONS

Examination Report dated Jul. 13, 2022 for UK Application No. GB2109936. I.
International Search Report of PCT No. PCT/CN2020/070386, dated Apr. 3, 2020.

\* cited by examiner (a)

(b)

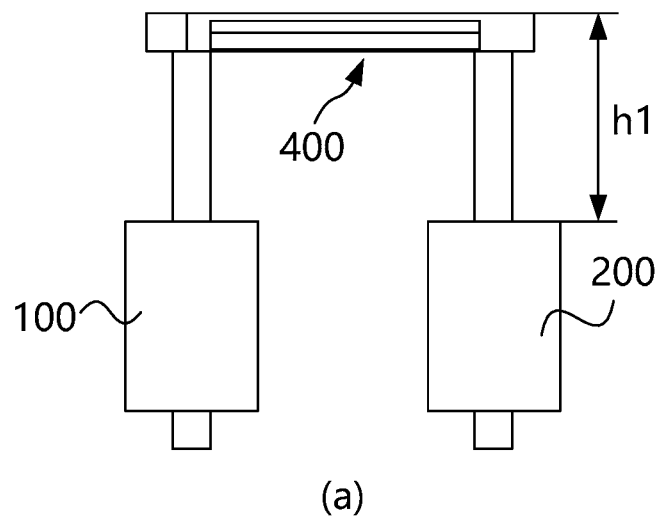
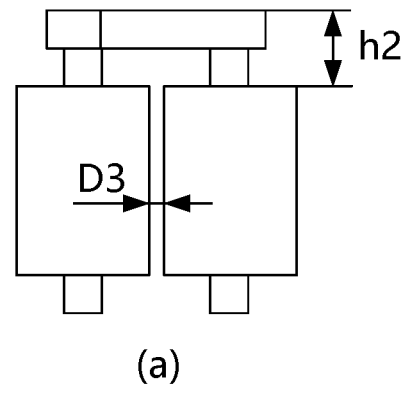
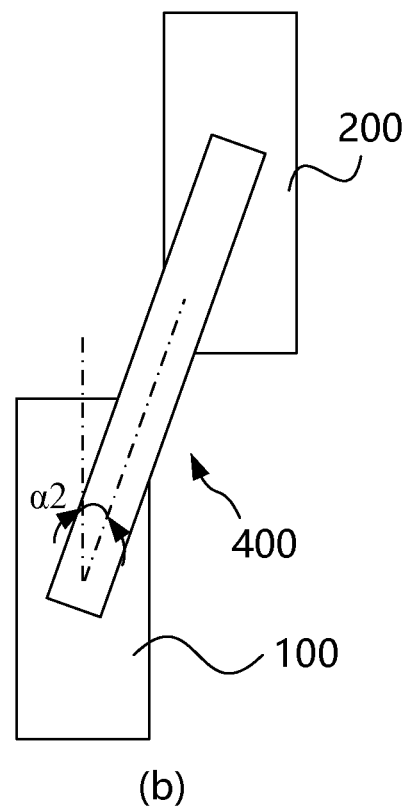
Fig. 3
Fig. 4

SECURITY INSPECTION DEVICE

CROSS-REFERENCES TO RELATED APPLICATIONS

The present disclosure is a national phase application of International Application No. PCT/CN2020/070386, filed on Jan. 6, 2020, which claims priority to China Patent Application No. 201910009046.2 filed on Jan. 4, 2019, the entireties of which are herein incorporated by reference.

FIELD

The present disclosure relates to the field of detection technology, and in particular to a security inspection device.

BACKGROUND

In some related technologies, the combined cargo/vehicle inspection system is required to travel along a longitudinal direction of the track when inspecting the cargo/vehicle to be inspected, so as to complete the overall scanning of the cargo/vehicle with a width.

In other related technologies, when the vehicle-mounted cargo/vehicle inspection system inspects the cargo/vehicle to be inspected, the vehicle in which an inspection device is carried realizes a longitudinal movement under control, so as to complete the overall scanning of the cargo/vehicle with a width.

SUMMARY

In one embodiment of the present disclosure, a security inspection device is provided. The security inspection device includes: a first vehicle body; a radiation source, arranged in the first vehicle body; a second vehicle body; a protective wall, arranged on the second vehicle body; a boom; and a plurality of detectors, arranged on the boom; and the boom is rotatably connected to the first vehicle body and the second vehicle body, so as to form an inspection passage together with the first vehicle body and the second vehicle body.

In some embodiments, the security inspection device further includes: at least one of a first driving wheel and a second driving wheel, and the first driving wheel is arranged on the first vehicle body to realize steering and travel of the first vehicle body, and the second driving wheel is arranged on the second vehicle body to realize steering and travel of the second vehicle body.

In some embodiments, the boom includes: a first vertical arm connected to the first vehicle body and rotatable about a vertical axis; a second vertical arm connected to the second vehicle body and rotatable about a vertical axis; a connection arm, both ends of which are connected to the first vertical arm and the second vertical arm respectively, and at least one end of which is rotatably connected; a first detection arm fixedly connected to the connection arm; and a second detection arm rotatably connected to the connection arm or the first detection arm so as to be unfolded to one side proximate to the second vertical arm or to be folded to one side proximate to the connection arm or the second detection arm according to operation conditions; and the plurality of detectors are mounted on the first detection arm and the second detection arm respectively.

In some embodiments, a scanning area from the radiation source to the plurality of detectors follows rotation of the boom relative to the first vehicle body and the second vehicle body.

In some embodiments, the boom is elevatable relative to the first vehicle body and the second vehicle body.

In some embodiments, a shift between different operation states of the security inspection device is realized by adjusting a height and rotation position of the boom relative to the first vehicle body and the second vehicle body.

In some embodiments, the operation states includes a scanning inspection state and a non-scanning inspection state, such that the boom is configured to be at a first height h1 in the scanning inspection state, and at a second height h2 in the non-scanning inspection state, and the first height h1 is greater than the second height h2.

In some embodiments, the scanning inspection state includes a first scanning inspection state and a second scanning inspection state, such that a plane where the boom being in the first scanning inspection state is situated is perpendicular to sides adjacent to each other of the first vehicle body and the second vehicle body so as to achieve vertical scanning, and a plane where the boom being in the second scanning inspection state is situated forms a preset first acute angle $\alpha1$ relative to sides adjacent to each other of the first vehicle body and the second vehicle body, so as to realize scanning at a preset angle.

In some embodiments, the non-scanning inspection state includes a transition state and a transportation state, such that the plane where the boom being in the transition state is situated is perpendicular to sides adjacent to each other of the first vehicle body and the second vehicle body, and the plane where the boom being in the transportation state is situated forms a preset second acute angle $\alpha2$ relative to sides adjacent to each other of the first vehicle body and the second vehicle body.

In some embodiments, the plane where the boom being in the transportation state is situated forms a preset second acute angle $\alpha2$ relative to sides adjacent to each other of the first vehicle body and the second vehicle body, and the first acute angle $\alpha1$ is greater than the second acute angle $\alpha2$, and a distance D3 between the first vehicle body and the second vehicle body in the transportation state is less than a distance D1 between the first vehicle body and the second vehicle body in the transition state.

In some embodiments, the first driving wheel is rotatably arranged on the first vehicle body through a first swing axle, and the first driving wheel is freely rotatable about the first swing axle; the second driving wheel is rotatably arranged on the second vehicle body through the second swing axle, and the second driving wheel is freely rotatable about the second swing axle.

In some embodiments, at least one of the first vehicle body and the second vehicle body is internally provided with an energy supply mechanism configured to realize energy supply of the security inspection device.

In some embodiments, the security inspection device further includes at least one of the following: a first rotation driving mechanism, arranged between the boom and the first vehicle body to drive the boom to rotate relative to the first vehicle body; and a second rotation driving mechanism, arranged between the boom and the second vehicle body to drive the boom to rotate relative to the second vehicle body.

In some embodiments, the security inspection device further includes at least one of the following: a first elevation driving mechanism, arranged between the boom and the first vehicle body to drive the boom to be elevated relative to the first vehicle body; and a second elevation driving mechanism, arranged between the boom and the second vehicle body to drive the boom to be elevated relative to the second vehicle body.

In some embodiments, the connection arm includes a telescopic device is moved telescopically to drive the connection arm to change a length of the connection arm.

In some embodiments, a connection bracket is provided between the connection arm and at least one of the first vertical arm and the second vertical arm, such that the connection bracket has a clearance fit with at least one of the connection arm, the first vertical arm and the second vertical arm.

BRIEF DESCRIPTION OF THE DRAWINGS

The accompanying drawings, which constitute part of this specification, illustrate exemplary embodiments of the present disclosure and together with this specification, serve to explain the principles of the present disclosure.

The present disclosure may be more clearly understood from the following detailed description with reference to the accompanying drawings, in which:

FIGS. 3(a) and 3(b) are structural schematic views in some embodiments of the security inspection device of the present disclosure in a front view and a top view respectively when in a small-angle scanning inspection state;

FIG. 4(a) and FIG. 4(b) are structural schematic views in some embodiments of the security inspection device according to the present disclosure in a front view and a top view respectively when in a transportation state.

Figure 1:
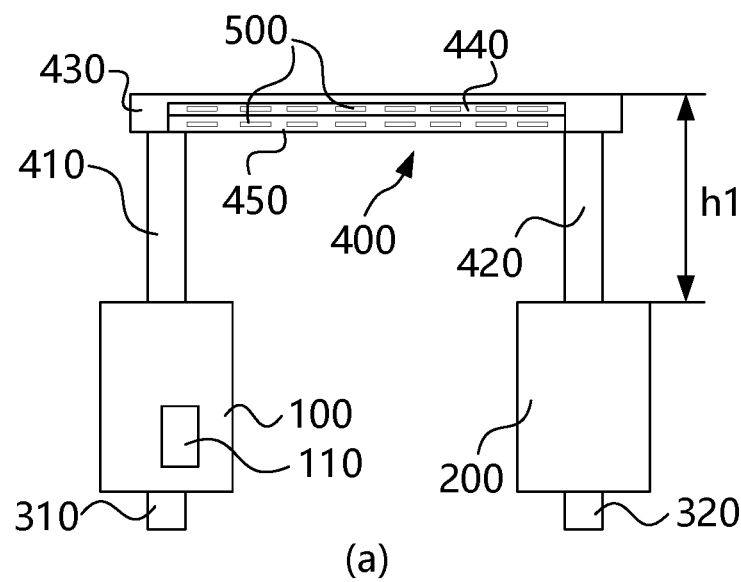
FIG. 1(a) and FIG. 1(b) are structural schematic views in some embodiments of the security inspection device according to the present disclosure in a front view and a top view respectively.
Figure 1:
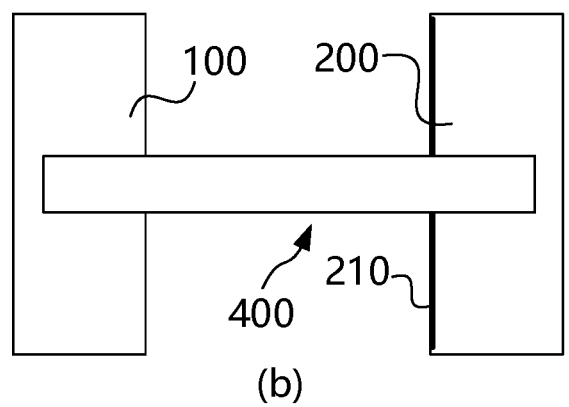

It should be understood that the dimensions of the various parts shown in the accompanying drawings are not drawn according to actual scaling relations. In addition, the same or similar components are denoted by the same or similar reference signs.

DETAILED DESCRIPTION OF THE DISCLOSURE

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure. It should be noted that, unless otherwise specified, the relative arrangements of the components and steps expounded in these embodiments should be construed as merely illustrative, rather than as a delimitation.

The use of the terms "first", "second" and similar words in the present disclosure do not denote any order, quantity or importance, but are merely used to distinguish between different parts. A word such as "comprise", "include" or variants thereof means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and there may be no intermediate device. When it is described that a particular device is connected to other devices, the particular device may be directly connected to said other devices without an intermediate device, and may not be directly connected to said other devices but with an intermediate device.

All the terms used in the present disclosure have the same meanings as understood in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

It has been found after studies that, in the combined cargo/vehicle inspection system of related technologies, the track is required to be laid on the operation site. Therefore, there are civil engineering requirements for the operation site, which results in a restricted scope of application and a relatively high construction cost. In addition, it is not easy for such inspection system that has a relatively large volume to perform transition and transportation. However, it is difficult for the vehicle-mounted cargo/vehicle inspection system in related technologies which is restricted by the vehicle's own movement ability, to adjust a position in some space-constrained environments (for example, a narrow operation site or the like), so that there are also certain adaptability problems.

In view of this, the embodiments of the present disclosure provide a security inspection device, which improves the adaptability.

As shown in FIGS. 1(a) and 1(b), they are structural schematic views in some embodiments of the security inspection device according to the present disclosure in a front view and a top view respectively. Referring to FIGS. 1(a) and 1(b), in some embodiments, the security inspection device includes: a first vehicle body 100, a second vehicle body 200, a boom 400, a radiation source 110, a protective wall 210, and a plurality of detectors 500. The radiation source 110 is arranged in the first vehicle body 100. The protective wall 210 is arranged on the second vehicle body 200 and configured to provide radiation protection and prevent radiation from doing harm to personnel around the security inspection device. A plurality of detectors 500 are provided on the boom 400. The boom 400 is rotatably connected to the first vehicle body 100 and the second vehicle body 200 respectively, and configured to form an inspection passage together with the first vehicle body 100 and the second vehicle body 200.

The radiation source 110 in the security inspection device emits radiation to one side of the second vehicle body, and the detector 500 can receive the radiation passing through the object to be inspected. By scanning multiple consecutive sections of the object to be inspected, it is possible to form a scanned image of the object to be inspected, which may be used in scenarios such as security inspection or internal quality inspection. The vehicle or cargo to be inspected may be stationary, and the security inspection device moves relative to the vehicle or cargo to be inspected, so that the vehicle or cargo to be inspected passes through the inspection passage formed by the boom, the first vehicle body and the second vehicle body. In one embodiment, the security inspection device is stationary, and the vehicle or cargo to be inspected spontaneously passes through the inspection passage formed by the boom, the first vehicle body and the second vehicle body.

In this embodiment, the boom 400 rotates relative to the first vehicle body 100 and the second vehicle body 200, so that it is possible to adjust the relative position between the first vehicle body 100 and the second vehicle body 200, so as to meet different environmental requirements and operation condition needs, improving the adaptability. In order to realize rotation of the boom 400 relative to the first vehicle body 100 and the second vehicle body 200, a first rotation driving mechanism may also be provided between the boom 400 and the first vehicle body 100 for driving the boom 400 to rotate relative to the first vehicle body. The second vehicle body 200 may rotate relative to the boom 400 as the boom 400 rotates. In other embodiments, a second rotation driving mechanism may also be provided between the boom 400 and the second vehicle body 200 for driving the boom 400 to rotate relative to the second vehicle body 200. The first vehicle body 100 may rotate relative to the boom 400 as the boom 400 rotates. In addition, in still other embodiments, a first rotation driving mechanism may be provided between the boom 400 and the first vehicle body 100, and a second rotation driving mechanism may be provided between the boom 400 and the second vehicle body 200. Each of the above-described rotation driving mechanisms may be in the form of an electric motor, a hydraulic motor, or a pneumatic motor.

Referring to FIG. 1(a), in some embodiments, in order to realize travel and steering of the first vehicle body 100, the security inspection device may further include a first driving wheel 310. The first driving wheel 310 is arranged on the first vehicle body 100 for realizing the steering and travel of the first vehicle body 100. In addition to rotation around own rotation axis to realize travel of the first vehicle body 100, the first driving wheel 310 may be rotatably arranged on the first vehicle body 100 through a first swing axle to rotate freely about the first swing axle so that it is possible to realize 360-degree all-directional steering. In this way, the first driving wheel 310 is driven to swing about the first swing axle, so that it is possible to achieve the steering of the first vehicle body 100.

Similarly, in order to realize travel and steering of the second vehicle body 200, the security inspection device may further include a second driving wheel 320. The second driving wheel 320 is arranged on the second vehicle body 200 for realizing the steering and travel of the second vehicle body 200. In addition to rotation around own rotation axis to realize travel of the second vehicle body 200, the second driving wheel 320 may be rotatably arranged on the second vehicle body 200 through a second swing axle to rotate freely around the second swing axle so as to realize 360-degree all-directional steering. In this way, the second driving wheel 320 is driven to swing around the second swing axle, so that it is possible to achieve the steering of the second vehicle body 200.

The first driving wheel 310 and the second driving wheel 320 described above may be travel wheels that may travel freely on the road, so as to realize convenient transition operations and also save the cost in civil engineering. In other embodiments, the first driving wheel 310 and the second driving wheel 320 described above may also be track wheels traveling on a track.

The first driving wheel 310 and the second driving wheel 320 are detachable relative to the first vehicle body 100 and the second vehicle body 200 respectively, so as to reduce the height during transport, or to replace the driving wheels as necessary. In other embodiments, the first driving wheel 310 and the second driving wheel 320 are also be non-detachable relative to the first vehicle body 100 and the second vehicle body 200, so as to simplify the assembling or transportation process. In addition, the security inspection device may also include only the first driving wheel 310 or the second driving wheel 320. The security inspection device may also include driven wheels that are indirectly driven and the like.

In FIG. 1(a), the boom 400 may include a first vertical arm 410, a second vertical arm 420, a connection arm 430, a first detection arm 440 and a second detection arm 450. The first vertical arm 410 is connected to the first vehicle body 100 and rotatable about a vertical axis. The second vertical arm 420 is connected to the second vehicle body 200 and rotatable about a vertical axis. In this way, the first vertical arm 410 and the second vertical arm 420 may rotate to different angular positions relative to the first vehicle body 100 and the second vehicle body 200 respectively.

Both ends of the connection arm 430 are connected to the first vertical arm 410 and the second vertical arm 420 respectively, and at least one end is rotatably connected. By means of a rotatable connection of the connection arm 430, the first vehicle body 100 and the second vehicle body 200 may be translated relatively with the swing of the connection arm 430, or the connection arm 430 may wing along with the relative movement between the first vehicle body 100 and the second vehicle body 200.

The first detection arm 440 is fixedly connected to the connection arm 430. The second detecting arm 450 is rotatably connected to the connection arm 430 or the first detecting arm 440, and configured to be unfolded to one side proximate to the second vertical arm 420 or folded to one side proximate to the connection arm 430 or the second detection arm 450 according to the operation conditions. The plurality of detectors 500 are mounted on the first detection arm 440 and the second detection arm 450 respectively. For example, when inspection is required, the second detection arm 450 may be unfolded to one side of the second vertical arm 420, so as to receive the radiation emitted by the radiation source 110 together with the first detection arm 440; and when transition or overall transportation is required, the detection arm 440 may be folded to one side of the first detection arm 440, so as not to interfere with an elevation movement of the boom 400.

In some embodiments, the connection arm 430 includes a telescopic device moves telescopically to drive the connection arm 430 to change a length of the connection arm 430. The telescopic device may be in the form of a hydraulic cylinder, an air cylinder, a pulley block, a ball screw or the like. The telescopic device may be extended to increase a distance between both ends of the connection arm 430, so that a distance between the vehicle bodies connected to the first vertical arm 410 and the second vertical arm 420 respectively is increased, satisfying the requirements for inspecting an object to be inspected having a large width. The other way around, the telescopic device may also be retracted to reduce a distance between both ends of the connection arm 430, so that a distance between the vehicle bodies connected to the first vertical arm 410 and the second vertical arm 420 respectively is reduced, lessening the space occupied by the security inspection device.

In addition, in order to allow the security inspection device to adapt to uneven ground conditions during the travel, a connection bracket may be provided between the connection arm 430 and at least one of the first vertical arm 410 and the second vertical arm 420. The connection bracket may have a clearance fit with the connection arm 430, and may also form at least one fit gap with the first vertical arm 410 or the second vertical arm 420. If a connection bracket is provided both between the connection arm 430 and the first vertical arm 410 and between the connection arm 430 and the second vertical arm 420, at least one fit gap may be formed between the connection bracket and each of the first vertical arm 410 and the second vertical arm 420. When a wheel on one side of the security inspection device warps or sinks during the travel, the fit gap may absorb an action force caused by different heights of the wheels on both sides, protect the boom in the security inspection device, and ensure the imaging quality.

In other embodiments of the security inspection device of the present disclosure, in addition to rotation relative to the first vehicle body 100 and the second vehicle body 200, the boom 400 may also be elevatable relative to the first vehicle body 100 and the second vehicle body 200. In this way, switching between different operation states of the security inspection device may be realized by adjusting a height and rotation position of the boom 400 relative to the first vehicle body 100 and the second vehicle body 200.

In order to realize elevation of the boom 400 relative to the first vehicle body 100 and the second vehicle body 200, a first elevation driving mechanism may also be provided between the boom 400 and the first vehicle body 100 for driving the boom 400 to be elevated relative to the first vehicle body 100. The second vehicle body 200 may implement adjusting a distance relative to the boom 400 as the boom 400 is elevated. In other embodiments, a second elevation driving mechanism may also be provided between the boom 400 and the second vehicle body 200 for driving the boom 400 to be elevated relative to the second vehicle body 200. The first vehicle body 100 may implement adjusting a distance relative to the boom 400 as the boom 400 is elevated. In addition, in still other embodiments, a first elevation driving mechanism may be provided between the boom 400 and the first vehicle body 100, and a second elevation driving mechanism may be provided between the boom 400 and the second vehicle body 200. Each of the elevation driving mechanisms described above may be in the form of a pulley block, an air cylinder, an oil cylinder or a linear electric motor.

For example, the operation states of the security inspection device may include a scanning inspection state and a non-scanning inspection state. Referring to FIG. 1, the boom 400 may be at a first height h1 in the scanning inspection state, so as to allow passage of the vehicles or cargos to be inspected. In the non-scanning inspection state, the boom 400 may be lowered to a second height h2. The first height h1 here is greater than the second height h2. In this way, the security inspection device may perform transition or loading transportation at a low height.

As shown in FIG. 3(a) and FIG. 3(b), they are structural schematic views in some embodiments of the security inspection device of the present disclosure in a front view and a top view respectively when in a small-angle scanning inspection state. Referring to FIG. 3(b), the scanning area from the radiation source 110 to the plurality of detectors 500 follows rotation of the boom 400 relative to the first vehicle body 100 and the second vehicle body 200. In this way, when a scanning angle is required to be adjusted, the driving arm 400 may be rotated by a preset angle relative to the first vehicle body 100 and the second vehicle body 200.

For example, the scanning inspection state may include a first scanning inspection state and a second scanning inspection state. In the first scanning inspection state, the plane where the boom 400 is situated may be perpendicular to the sides adjacent to each other of the first vehicle body 100 and the second vehicle body 200 (referring to FIG. 1(b)), so as to achieve vertical scanning. In the second scanning inspection state, the plane on which the boom 400 is situated may form a preset first acute angle $\alpha 1$ relative to the sides adjacent to each other of the first vehicle body 100 and the second vehicle body 200, so as to achieve scanning at a preset angle. By combining vertical scanning and scanning at a preset angle, it is possible to obtain images of the object to be inspected at different angles, facilitating identification by the operator.

As the rotation angle of the boom 400 relative to the first vehicle body 100 and the second vehicle body 200 varies, the distance between the first vehicle body 100 and the second vehicle body 200 may be converted from D1 that is larger to D2. The distances D1 and D2 may both allow passage of the object to be inspected.

For the security inspection device, the non-scanning inspection state includes a transition state and a transportation state. When in the transition state, the security inspection device may travel within the operation site or between different operation sites by means of own travel mechanism (for example, the first driving wheel and the second driving wheel respectively arranged on the first vehicle body and the second vehicle body). In the transportation state, the security inspection device may be loaded into a transport vehicle, a ship or an aircraft for transport.

Figure 2:
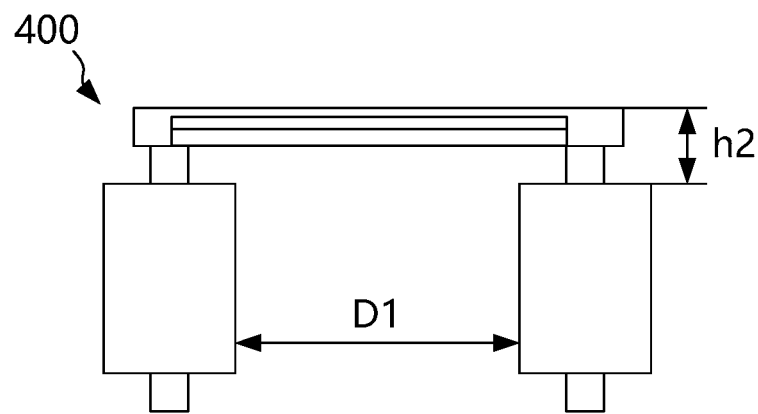
FIG. 2 is a schematic structural view in some embodiments of the security inspection device according to the present disclosure when in a transition state.

Referring to FIG. 2, when the security inspection device is in a transition state, the plane where the boom 400 is situated may be perpendicular to the sides adjacent to each other of the first vehicle body 100 and the second vehicle body 200, so that the security inspection device is more balanced during the travel, and less prone to tilting. At this time, the boom 400 may also be lowered to a lower height h2, so as to increase a passage capacity of the security inspection device during the transition.

Referring to FIGS. 4(a) and 4(b), when preparation is made for transportation of the security inspection device, the plane where the boom 400 is situated form a preset second acute angle $\alpha 2$ relative to the sides adjacent to each other of the first vehicle body 100 and the second vehicle body 200, and the second acute angle $\alpha 2$ is smaller the first acute angle $\alpha 1$ defined by the plane where the boom 400 being in the second scanning inspection state of the security inspection device is situated with the sides adjacent to each other of the first vehicle body 100 and the second vehicle body 200. In addition, in the transportation state, the distance D3 between the first vehicle body 100 and the second vehicle body 200 may be less than the distance D1 between the first vehicle body 100 and the second vehicle body 200 in the transition state. In this way, the first vehicle body 100 is relatively proximate to the second vehicle body 200, reducing the space occupied by the security inspection device in a width direction. At this time, the boom 400 may also be lowered to a lower height h2, so as to reduce the space occupied by the security inspection device in a height direction.

In the embodiments of the security inspection device described above, the rotation of the boom 400 relative to the first vehicle body 100 and the second vehicle body 200 may be achieved by driving the rotation of the boom 400. For example, the first vehicle body 100 is made to be stationary, and the first vertical arm 410 is driven to rotate to a front side. The second vertical arm 410 drives the connection arm 430 to rotate, and one end of the connection arm 430 proximate to the second vertical arm 420 moves as the connection arm 430 rotates, and drives the second vertical arm 420 and the second vehicle body 200 to move to a front side. In other embodiments of the security inspection device, it may also be achieved by driving the first vehicle body 100 to move relative the second vehicle body 200. For example, the first vehicle body 100 is made to be stationary, and the second vehicle body 200 is moved forward, driving the boom 400 to rotate.

In order to simplify the security inspection device and realize rapid transition, in some embodiments, the security inspection device may be implemented without an external power supply. Correspondingly, an energy supply mechanism may be provided within at least one of the first vehicle body 100 and the second vehicle body 200 for realizing the energy supply of the security inspection device. The energy supply mechanism may include a battery or a generator so as to realize power supply in the security inspection device. The energy supply mechanism may also include a supply device that uses fuel or steam as an energy source.

Hereto, various embodiments of the present disclosure have been described in detail. Some details well known in the art are not described in order to avoid obscuring the concept of the present disclosure.

What is claimed is:

1. A security inspection device, comprising:
a first vehicle body;
a radiation source, arranged in the first vehicle body;
a second vehicle body;
a protective wall, arranged on the second vehicle body;
a boom; and
a plurality of detectors, arranged on the boom;
wherein the boom is rotatably connected to the first vehicle body and the second vehicle body, to form an inspection passage together with the first vehicle body and the second vehicle body, and the boom comprises:
a first vertical arm connected to the first vehicle body and rotatable about a vertical axis;
a second vertical arm connected to the second vehicle body and rotatable about a vertical axis; and
a connection arm, both ends of which are connected to the first vertical arm and the second vertical arm respectively, and at least one end of which is rotatably connected.

2. The security inspection device according to claim 1, further comprising: at least one of a first driving wheel and a second driving wheel, wherein the first driving wheel is arranged on the first vehicle body to realize steering and travel of the first vehicle body, and the second driving wheel is arranged on the second vehicle body to realize steering and travel of the second vehicle body.

3. The security inspection device according to claim 2, wherein the first driving wheel is rotatably arranged on the first vehicle body through a first swing axle, and the first driving wheel is freely rotatable about the first swing axle; the second driving wheel is rotatably arranged on the second vehicle body through a second swing axle, and the second driving wheel is freely rotatable about the second swing axle.

4. The security inspection device according to claim 1, wherein the boom further comprises:
a first detection arm fixedly connected to the connection arm; and
a second detection arm rotatably connected to the connection arm or the first detection arm so as to be unfolded to one side proximate to the second vertical arm or to be folded to one side proximate to the connection arm or the first detection arm according to operation conditions;
wherein the plurality of detectors are mounted on the first detection arm and the second detection arm respectively.

5. The security inspection device according to claim 1, wherein a scanning area from the radiation source to the plurality of detectors follows rotation of the boom relative to the first vehicle body and the second vehicle body.

6. The security inspection device according to claim 1, wherein the boom is elevated relative to the first vehicle body and the second vehicle body.

7. The security inspection device according to claim 6, wherein a shift between different operation states of the security inspection device is realized by adjusting a height and rotation position of the boom relative to the first vehicle body and the second vehicle body.

8. The security inspection device according to claim 7, wherein the operation states comprises a scanning inspection state and a non-scanning inspection state, wherein the boom is configured to be at a first height h1 in the scanning inspection state, and at a second height h2 in the non-scanning inspection state, wherein the first height h1 is greater than the second height h2.

9. The security inspection device according to claim 8, wherein the scanning inspection state comprises a first scanning inspection state and a second scanning inspection state, wherein in the first scanning inspection state, a plane where the boom is situated is perpendicular to a first side and a second side adjacent to each other of the first vehicle body and the second vehicle body, and wherein in the second scanning inspection state, the plane on which the boom is situated forms a preset first acute angle α1 relative to the first side and second side adjacent to each other of the first vehicle body and the second vehicle body.

10. The security inspection device according to claim 9, wherein the non-scanning inspection state comprises a transition state and a transportation state, wherein a plane where the boom being in the transition state is situated is perpendicular to sides adjacent to each other of the first vehicle body and the second vehicle body, and the plane where the boom being in the transportation state is situated forms a preset second acute angle α2 relative to sides adjacent to each other of the first vehicle body and the second vehicle body.

11. The security inspection device according to claim 10, wherein the first acute angle α1 is greater than the second acute angle α2, and a distance D3 between the first vehicle body and the second vehicle body in the transportation state is less than a distance D1 between the first vehicle body and the second vehicle body in the transition state.

12. The security inspection device according to claim 6, further comprising at least one of the following:
a first elevation driving mechanism, arranged between the boom and the first vehicle body to drive the boom to be elevated relative to the first vehicle body; and
a second elevation driving mechanism, arranged between the boom and the second vehicle body to drive the boom to be elevated relative to the second vehicle body.

13. The security inspection device according to claim 1, wherein at least one of the first vehicle body and the second vehicle body is internally provided with an energy supply mechanism configured to realize energy supply of the security inspection device.

14. The security inspection device according to claim 1, further comprising at least one of the following:

a first rotation driving mechanism, arranged between the boom and the first vehicle body to drive the boom to rotate relative to the first vehicle body; and a second rotation driving mechanism, arranged between the boom and the second vehicle body to drive the boom to rotate relative to the second vehicle body.

15. The security inspection device according to claim 3, wherein the connection arm comprises a telescopic device moving telescopically to drive the connection arm to change a length of the connection arm.

16. The security inspection device according to claim 3, wherein a connection bracket is provided between the connection arm and at least one of the first vertical arm and the second vertical arm, wherein the connection bracket has a clearance fit with at least one of the connection arm, the first vertical arm and the second vertical arm.

\* \* \* \* \*